United States Patent [19]

St. Petery, Jr.

[11] 4,000,601
[45] Jan. 4, 1977

[54] FRUIT HARVESTING MACHINE

[76] Inventor: Richard A. St. Petery, Jr., P.O. Box 74, Mount Royal, N.J. 08061

[22] Filed: Apr. 9, 1974

[21] Appl. No.: 459,297

[52] U.S. Cl. .............................................. 56/328 R
[51] Int. Cl.² ......................................... A01D 46/00
[58] Field of Search .................. 56/328 R, 330, 130

[56] References Cited
UNITED STATES PATENTS

| | | | |
|---|---|---|---|
| 1,650,796 | 11/1927 | Kellogg | 56/328 R |
| 2,643,754 | 6/1953 | Doak | 56/328 R X |
| 2,658,637 | 11/1953 | Bailey | 56/328 R X |
| 2,729,046 | 1/1956 | Patterson | 56/328 R |
| 3,253,392 | 5/1966 | Barrat | 56/328 R |
| 3,413,787 | 12/1968 | Van Antwerp et al. | 56/328 R |
| 3,552,107 | 1/1971 | Swift | 56/328 R |

Primary Examiner—Russell R. Kinsey
Attorney, Agent, or Firm—Weiser, Stapler & Spivak

[57] ABSTRACT

A fruit harvesting machine employs a rotating pneumatic cylinder and a spaced picking plate between which the fruits pass to be turned and snapped off. Flexible combing fingers extend from the cylinder and pass through fruit tree branches to open them and to bring the fruit into the space between picking plate and cylinder.

11 Claims, 5 Drawing Figures

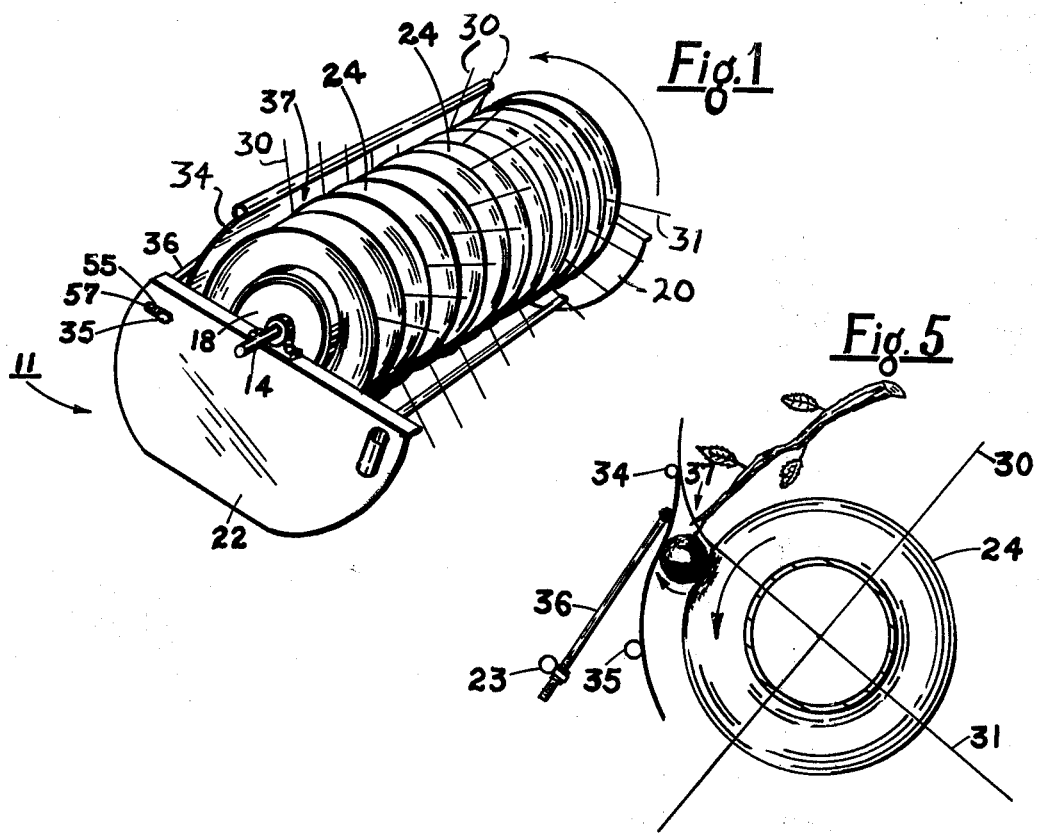
Fig. 1
Fig. 5
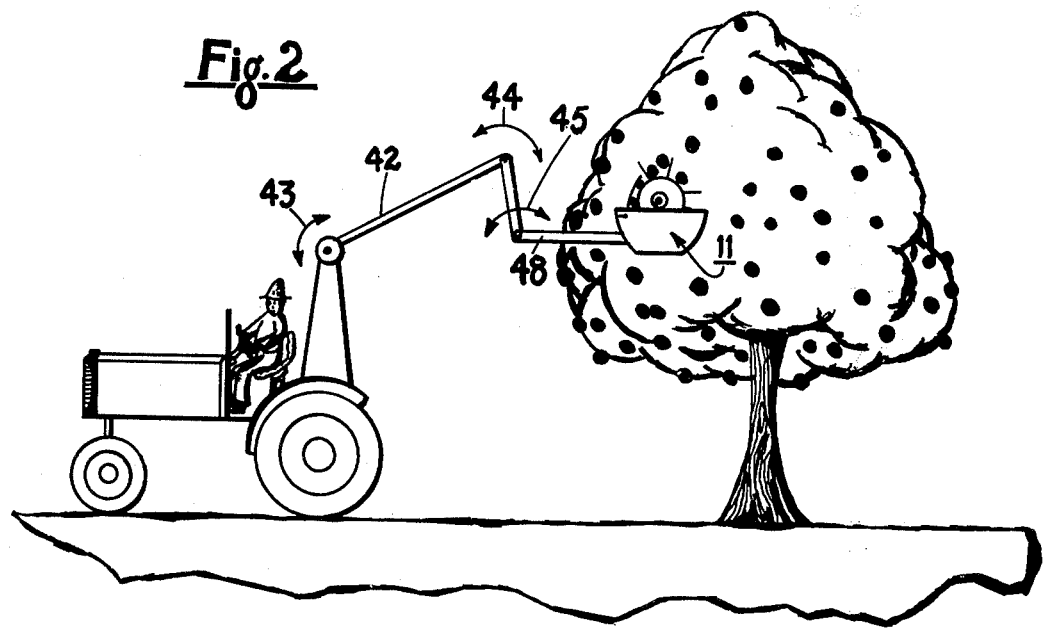
Fig. 2

FRUIT HARVESTING MACHINE

BACKGROUND AND BRIEF DESCRIPTION OF THE INVENTION

This invention relates to a fruit harvesting machine, and particularly to an improved fruit harvester for the picking of fruit such as oranges and the like from trees.

Various techniques have been employed for automatic fruit harvesting equipment. These include devices for engaging the fruit and for pulling at it or rotating it so as to remove it from its stem. Prior art devices of this type are illustrated, for example, in U.S. Pat. Nos. 3,517,496, 3,543,492, and 3,543,594. Such devices have not been put into general practice and there remains a need for an effective fruit picking device.

Accordingly, it is among the objects of this invention to provide a new and improved fruit harvesting machine.

Another object is to provide a fruit harvesting machine which is efficient in operation and which does not injure the fruit to be picked.

Another object is to provide a new and improved fruit harvesting machine which is economical in construction.

In accordance with one embodiment of this invention, a fruit harvesting machine comprises a round rotatable body having a generally soft outer surface for engaging the fruit to be harvested without injury thereto. A stationary member is mounted adjacent to the round body and is spaced therefrom a distance corresponding approximately to the diameter of the smallest fruit to be harvested. The round body is mounted for rotation about an axis, the direction of which is selectively changed to position the rotatable body against the fruit tree. The body is moved transversely to the axis of rotation to bring the surface thereof adjacent to fruit for access to the fruit to be harvested. In addition, means is provided for bringing the fruit on the branches into the space between the round body and stationary member where the picking operation occurs. This means includes means for combing through the fruit-laden branches of a tree while the round body is rotating. The combing means includes a plurality of elongated fingers which project outwardly from the round body and are rotatable with it. The fingers engage the fruit-laden branches and the fruit to be harvested and move the fruit into the space between the round body and the stationary member with the stems and branches trailing behind the fruit. The slender fingers are formed of yieldable material and are effective to bring the fruit into the position where it can be turned by the rotating body transversely to the stems and branches for its removal.

BRIEF DESCRIPTION OF THE DRAWING

The foregoing and other objects of this invention, the various features thereof, as well as the invention itself, may be more fully understood from the following description when read together with the accompanying drawings, in which:

FIG. 1 is a perspective view of a fruit harvesting machine embodying this invention;

FIG. 2 is a side view of the machine of FIG. 1 mounted on an adjustable boom attached to a vehicle and in position for engaging a fruit tree;

FIG. 5 is a schematic sketch of a portion of the harvesting machine illustrating its picking operation.

In the drawing, corresponding parts are referenced throughout by similar numerals.

DESCRIPTION OF A PREFERRED EMBODIMENT

Figure 3:
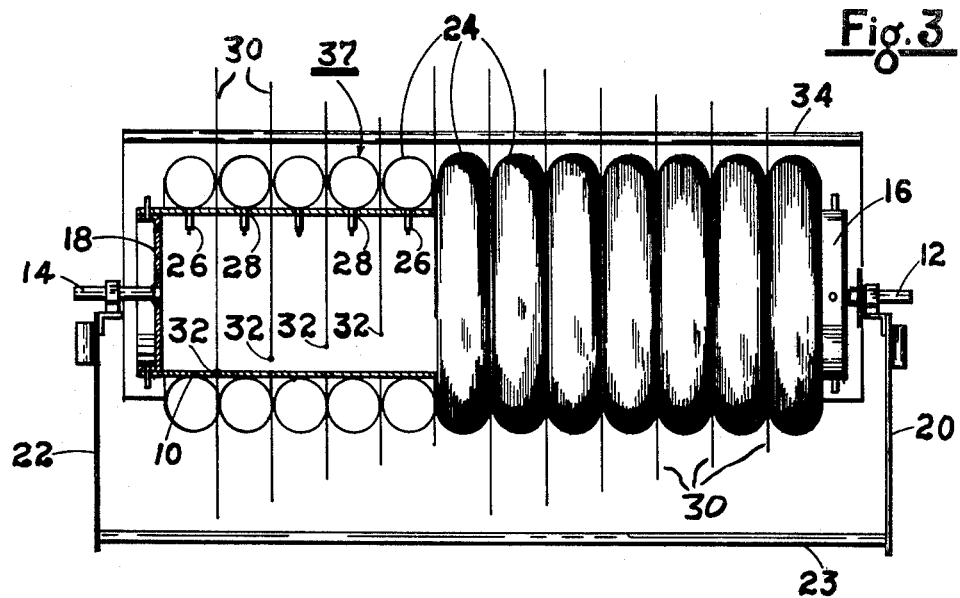
FIG. 3 is an enlarged front view of the machine of FIG. 1, partly in section.

In the embodiment of the invention illustrated in the drawings, the fruit harvesting machine 11 includes a cylinder 10, preferably of metal, which is mounted on end shafts 12 and 14 which are fixed into the centers of end plates 16 and 18 closing the ends of cylindrical body 10. The shafts are journaled in a suitable fashion on mountings 20 and 22, which are essentially standards which support the shafts 12 and 14 and thereby the cylindrical body 10.

Mounted on the cylindrical body 10 are a series of pneumatic tubes generally toroidal in shape and made of a soft, yieldable material such as rubber. In an experimental form of the invention, the tubes 24 took the form of inflatable inner tubes for automobile tires. The inflating valve 26 for each tube was inserted through a hole 28 in the cylindrical wall, which valve 26 was effective to retain the tube 24 against lateral movement along the axis of cylinder 10, and also from rotary sliding around cylinder 10 when a load is frictionally applied thereto. In addition, the tight fit of each tube 24 when inflated on the wall 10 likewise tends to retain it in operating position.

The series of tubes 24 is assembled in a tight sequence along the wall and the outer surfaces of the tubes provide a generally cylindrical fruit-engaging surface. These tube surfaces not only engage the fruit and provide a soft, yieldable, somewhat frictional surface for engaging and turning the fruit, but the tubes 24 also engage the harsh branches of the tree on which the fruit is located and therefore have to be a tough surface and have to resist punctures due to the sharp points on broken branches. For that reason, these tubes are preferably formed of a suitable plastic whose outer surface is reinforced by steel wire webbing.

Between each adjacent two tubes 24 is at least one separate rod 30 which extends through openings in the wall of cylinder 10 and projects diametrically therefrom and beyond the tubes 24 some six or eight inches. Each rod 30 must be effective to comb through tangled branches in a tree and must therefore have sufficient stiffness for that task, and at the same time, must engage the fruit and yield under stresses and strains. For this purpose, a plastic tubing has been found to be suitable and it is preferably internally reinforced by steel wire to provide the desired stiffness.

Preferably two such plastic rods 30 and 31 are located between each two adjacent tubes 24. The two rods are approximately at right angles to each other so that four projecting rod portions are spaced around each tube. The diametrical openings 32 in the cylindrical wall for each rod 30 and 31 are formed in a staggered fashion about the drum so as to form what appears to be a spiral configuration of the rods 30 and 31. Thus, the rods 30 and 31 are successively offset from rods located between adjacent tubes so that effectively only one or a few of these rods 30 are combing through tangled and knotted tree branches at any particular point of rotation of the tubes 24. In this fashion, the load on the rods is limited and they can yield under excessive loads without themselves breaking and without breaking the tree's branches.

The driving surface formed by the tubes 24 is approximately 2 to 1½ feet in diameter, in one specific form of the invention, and a sequence of some 12 to 15 tubes formed on the cylinder 10 extends about 4 to 5 feet in length. A suitable reinforced canvas covering may be applied over the inflatable tubes 24 in order to provide a suitable frictional surface for engaging the fruit and also to take up the wear and tear of engaging the sharp branches of the trees. This canvas covering would fit tightly over the tubes and thereby tend to provide a more uniform cylindrical surface for engaging the fruit, and suitable openings would be provided in the covering which are reinforced to receive tightly the plastic rods 30, 31. In an experimental form of the invention, caulking was applied to the cracks between tubes 24 to prevent branches from getting caught therebetween.

A picking plate 34 is mounted adjustably in stationary fashion on one side of the inflatable tubes. The plate is generally arcuate in shape, mounted to be spaced from the tubes and to extend around the tubes a relatively short distance, for example, about one-third of the diameter of the tube. Plate 34 near its lower end is pivotally attached to a pivot rod 35 connected between standards 20 and 22. The lower end of the picking plate 34 is secured between the frame standards 20, 22 and has no motion or movement relative thereto. The outer or unsecured end of the picking plate is free to move either toward or away from the peripheral surface of the tubes 24 in a pivotal fashion about the pivot rod 35 as best seen in FIG. 5. Picking plate 34 is adjustably positioned around that pivot rod 35 by means of a plurality of screw rods 36 mounted in nuts attached to a cross member of the mounting frame members 23 that connect standards 20 and 22. With this arrangement, the plate can be adjusted to be positioned at varying spacings from the outer surface of the inflatable tubes 24. The spacing should be adjusted so that the picking plate 34 is located closer to the tubes 24 than the smallest fruit to be selectively picked, whereby a slight depression of the tubes 24 is produced by the fruit being forced between the picking plate and the tube 24. The air pressure in the tubes 24 is set depending on the type of fruit to be sufficiently low so that the fruit surface is not injured. The upper edge of the picking plate 34 is spaced much more widely from the surface of the tube 24 so as to readily receive all of the fruit moved toward the picking plate and to guide that fruit into the picking passage 37 between the plate and the tubes 24.

The drive mechanism for the shafts 12 and 14 may take any suitable form, such as an electric motor 38 which rotates the shafts through a suitable chain and pulley drive 40. Preferably, the unit is mounted on a hydraulic boom 42 attached to a tractor or a truck and the power for the motor 38 is from the engine power supply of the tractor. The tractor is effective to carry the harvesting machine and via the hydraulic boom to elevate it to the desired height and location of a tree whose fruit is to be harvested, (FIG. 2) and with an appropriate orientation to place the harvester unit in position for operation. The arrows 43, 44, 45 at the joints of the boom 42 indicate the various desirable directions of movement of the boom to locate the harvester at a desired portion of the tree, to orient the axis of rotation of the tubes and the angle of tilt of the picking plate and thereby of the picking passage, so as to achieve the desired approach to the fruit to be picked. A plate 46 at the rear of the machine and fixed to the frame members 23 has pivoted thereto a boom member 48 which has a pin 50 slidable in a guide groove 52 for tilting adjustment of the machine and its picking passage 37. The boom members 42, 48 may be interconnected by an arm or link in conventional manner, as illustrated in FIG. 2, to facilitate a full range of movement for harvester location in the directions indicated by the arrows 43, 44, 45. Separate hydraulic or other motors at each of the boom joints can be used for the desired adjustments. Suitable boom equipped tractors or trucks are well known and available for this purpose.

In operation, the rotating cylinder 10 of tubes 24 is applied to the outer surface of the portion of the tree where the fruit picking is to take place. As the cylindrical body 25 rotates, the plastic rods 30 and 31 likewise rotate. They project beyond the cylindrical body of tubes 24, and they move through the branches of the tree at the outer portions where the foliage and fruit tend to be located. As the rods separate and comb through the branches, they tend to pull the branches toward the mouth of the picking passage 37, and likewise bring the dangling fruit to that location. The combing rods 30 and 31 tend to pull the fruit into the picking passage 37 with the fruit stems and branches dragging behind. The combing rods bend out of the way as they pass through the picking passage 37 and spring back after leaving that passage.

As the fruit passes through the picking passage 37 between the picking plate 34 and the rotating cylinder, the soft pneumatic surface of the tubes 24 yields (as shown in FIG. 5) and a firm frictional grip between plate and tubes is applied to the fruit which turns the fruit around a transverse axis which is generally at about 90° to the stem attached to the fruit. This transverse turning action is effective to cause the fruit to part from its stem. The picked fruit continues to rotate down between the picking plate 34 and the rotating tubes 24, and upon leaving the picking plate falls into a hopper below. The fruit may be collected in the hopper or may be passed by an appropriate chute into a central collection point.

When the fruit is picked from its stem, the rotating rod engaging the associated branch is bent and rotated out of engagement. Consequently, the tension on the stem from which the fruit was picked tends to be relieved and likewise the tension on the attached branches is relieved, and these branches snap back into normal position. Since the combing rods 30 and 31 are staggered, only one small portion of the cylindrical picker is loaded at any time, but successively each portion is placed in operation to comb through the outer branches of the tree and to carry the fruit-laden stems into the picking passage 37 between the picking plate and the rotating cylinder. With the boom 42 on the tractor, the harvesting machine can be located at the high as well as low branches, and at any portion around the tree. The aforementioned motor controls for this boom in known equipment are effective to elevate the rotary axis of the harvesting machine, to turn the rotary axis about a transverse axis along the boom 48 and to change the angle of the picking passage 37 by tilting the boom 48. Thereby, the rotary body 25 can be pressed into position against the desired portion of the tree where the picking is to take place.

By reinforcing the tubular rods 30 with steel wire, the rods retain their effectiveness as yieldable combing fingers, but are also more resilient for purposes of being restored to shape and position after passing through the picking passage 37 between the picking plate and rotating cylinder.

To avoid jamming of heavy branches in the picking passage 37, the pivot rod 35 for the picking plate is mounted in elongated slots 54 and 55 which are respectively provided in horizontally opposed position in the frame standards 20, 22. The pivot rod 35 is biased by relatively heavy springs 56 and 57 respectively operating within those slots, toward the outer periphery of the tubes 24. Thereby, under the heavy load of branches forced into the picking passage, the springs 56 and 57 yield and the free end of the plate 34 moves away from the periphery of the tubes 24 to release the branches.

Various modifications of this invention will be apparent to those skilled in the art from the foregoing description. For example, the pneumatic picking cylinder may be formed as a single tube which is generally inflatable from one location, with walls forming isolated passages through the tube in order that the combing finger rods 30 may be positioned therein. The individual inflated tubes 24 are advantageous in that it has been found that occasionally punctures will take place in the tube due to the sharp points on broken branches, and a puncture in one tube would not disable the entire apparatus. Though a pneumatic body has been found effective, other yieldable surfaces may also be used.

In place of the pneumatic tubes 24, a firm rotary surface may be provided, and the picking plate 34 may be constructed with a yieldable surface for engaging the fruit, which yieldable surface may be formed by means of a pneumatic or cushioned construction. The rotatable body 25 may be other than a cylindrical shape; for example, it may be oval or spherical, and the picking plate would be constructed to have a similar curvature and shaped to be generally parallel to it. In addition, the rotary body 25 may be constructed to have other than a circular cross section; for example, irregularities of the surface may be employed to engage and pick the fruit more effectively.

Figure 4:
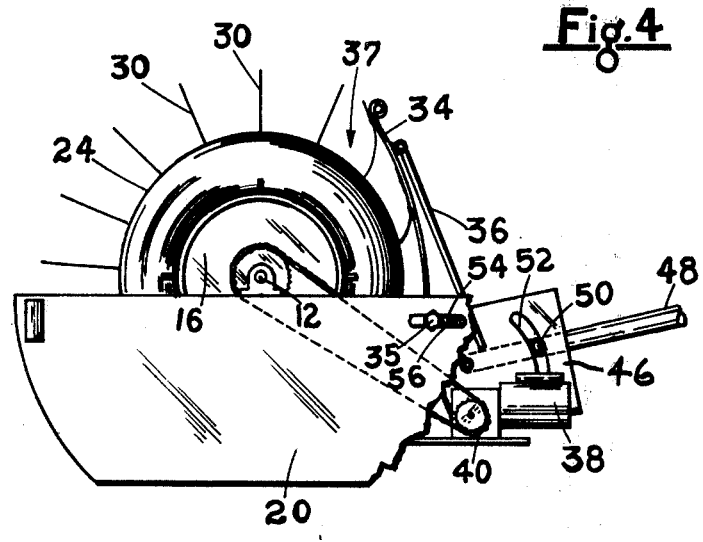
FIG. 4 is an end view as viewed from the left end of FIG. 2 with parts cut away.

The construction of the mounting frame for the rotary body 25 may be simplified. That is, the frame of FIGS. 1, 3 and 4 is essentially yoke-shaped, with the shafts 12 and 14 rotatable on the arms 20 and 22 of the yoke and the picking plate 34 adjustable on the cross bar thereof. By reducing the size of the side plates 20 and 22 to slender members, for example, by the use of steel box tubes therefor, and by using such a box tube for the cross arm to which the picking plate is pivoted, the reinforcement rod 23 would be unnecessary and a much neater frame can be achieved to avoid entanglement with the branches of the tree during harvesting.

Other modifications will be apparent from this description to meet the needs of different types of fruit to be harvested (oranges have been effectively harvested with the above described equipment). Accordingly, a new and improved harvesting machine has been provided, which is effective in large scale automatic harvesting of oranges and other fruit. The machine is effective in harvesting the fruit without injury thereto, and may be readily constructed in an inexpensive fashion.

What is claimed is:
1. A fruit harvesting machine comprising:
 a frame;
 a round body mounted within the frame and having a generally soft outer surface;
 a picking plate having a first portion thereof secured to the frame and having a second portion mounted adjacent to said round body and spaced therefrom a distance corresponding approximately to the diameter of fruit to be harvested;
 said round body being mounted within the frame for rotation about an axis relative to the picking plate, means for rotating said body relative to the frame and the picking plate to engage said fruit between said outer surface and the picking plate to remove said fruit from its stem;
 and combing means extending outwardly from the outer surface for combing through fruit laden branches upon rotation of said body for moving said fruit into the space between said round body and the picking plate, the combing means extending outwardly a distance at least equal to the diameter of the fruit.

2. A fruit harvesting machine as recited in claim 1 wherein said combing means includes a plurality of elongated yieldable fingers projecting outwardly from said round body and rotatable therewith for engaging the fruit laden branches and the fruit to be harvested and means to limit the number of fingers simultaneously engaged upon said branches, said means to limit being positioned in non-linear arrangement.

3. A fruit harvesting machine as recited in claim 1 wherein said round body is formed as a pneumatic cylinder and wherein fingers project radially outwardly therefrom.

4. A fruit harvesting machine as recited in claim 1 and adjustment means carried by the frame to vary the spacing between the second portion and said round body in accordance with the size of the fruit to be harvested, so as to effectively engage the fruit for removal thereof.

5. A fruit harvesting machine as recited in claim 2 wherein at least some of said fingers contact the picking plate as the body is rotated.

6. A fruit harvesting machine as recited in claim 5 wherein at least some of said fingers project from said round body a distance greater than said space between said round body and the picking plate second portion, said fingers being bent relative to the round body when passing between said space.

7. The fruit harvesting machine of claim 2 wherein said fingers project radially and wherein said means to limit comprises a plurality of said fingers being positioned about the round body in circumferentially offset arrangement.

8. The fruit harvesting machine of claim 2 wherein said means to limit comprise at least some of said fingers being rotatively successively offset to project at different rotary positions around said body so that only a small number thereof are engaged upon the branches of a tree in any rotary position.

9. A device for picking generally spherical fruit from plants comprised of:
 a frame;
 a picking plate carried by the frame and defining a first surface;
 a cylindrical tube rotatable within the frame and defining a second surface, said second surface being spaced from said first surface to define an arcuate channel of width approximately less than the diameter of the smallest of said fruit, said second surface extended beyond said first surface, for engaging outer portions of said fruit plant;

combing means attached to the tube and projecting outwardly from said second surface to engage branches of the plant, said combing means extending outwardly a distance greater than the width of the channel, said combing means being rotatable through said channel;

drive means connected to the frame to adjustably position the tube, combing means and picking plate to press a portion of said second surface against the fruit plant to be harvested so that the combing means comb through the branches and extend said branches in the direction of surface translation to cause fruit on said branches to be frictionally engaged between said first and second surfaces, whereby frictional engagement of fruit and translation of one surface induce rotation of said fruit in the direction of translation, for removal thereof.

10. The device of claim 9 wherein the combing means comprise a plurality of flexible fingers, at least some of said fingers projecting outwardly from the second surface a distance greater than the spacing between the first and second surfaces said fingers being bent within the channel and having portions in contact with the picking plate.

11. The device of claim 9 wherein said combing means comprise a plurality of fingers, said fingers being longitudinally spaced along the length of the tube, at least a majority of said fingers being angularly rotatively offset from an adjacent finger, said majority of said fingers being positioned in non-linear arrangement about the periphery of the round body.

* * * * *